United States Patent
Yoo et al.

(10) Patent No.: US 8,205,128 B2
(45) Date of Patent: Jun. 19, 2012

(54) APPARATUS AND METHOD FOR HYBRID AUTOMATIC REPEAT REQUEST (HARQ) IN WIRELESS COMMUNICATION SYSTEM

(75) Inventors: Kyung-Chul Yoo, Gwacheon-si (KR);
Jin-Woo Roh, Suwon-si (KR);
Bong-Gee Song, Seongnam-si (KR);
Dong-Min Kim, Anyang-si (KR);
Jung-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 12/287,310

(22) Filed: Oct. 8, 2008

(65) Prior Publication Data
US 2009/0100310 A1    Apr. 16, 2009

(30) Foreign Application Priority Data
Oct. 10, 2007    (KR) .................. 10-2007-0101822

(51) Int. Cl.
*H04L 1/18*    (2006.01)

(52) U.S. Cl. ........................................ 714/748

(58) Field of Classification Search ............... 714/748, 714/749
See application file for complete search history.

(56) References Cited

U.S. PATENT DOCUMENTS

| | | | |
|---|---|---|---|
| 7,003,709 B2 * | 2/2006 | Wengerter et al. | 714/748 |
| 7,096,400 B2 * | 8/2006 | Lim et al. | 714/748 |
| 7,500,166 B2 * | 3/2009 | Miyazaki et al. | 714/748 |
| 7,693,125 B2 * | 4/2010 | Ihm et al. | 370/343 |
| 8,005,051 B2 * | 8/2011 | Watanabe | 370/335 |
| 8,042,028 B2 * | 10/2011 | Lin | 714/790 |
| 2006/0156162 A1 | 7/2006 | Choi et al. | |

FOREIGN PATENT DOCUMENTS
KR    1020060060488 A    6/2006

\* cited by examiner

*Primary Examiner* — James C Kerveros

(57) ABSTRACT

An apparatus and a method for Hybrid Automatic Repeat reQuest (HARQ) in a wireless communication system are provided. A receiver includes a Media Access Control (MAC) layer part for error-checking each MAC Packet Data Units (PDUs) extracted from a physical layer burst, and generating HARQ combination control information according to a result of the error check; a receiving part for receiving a retransmit burst; and a combiner for selecting one or more Forward Error Correction (FEC) blocks from the retransmit burst according to the HARQ combination control information, and HARQ-combining the selected one or more FEC blocks.

20 Claims, 6 Drawing Sheets

APPARATUS AND METHOD FOR HYBRID AUTOMATIC REPEAT REQUEST (HARQ) IN WIRELESS COMMUNICATION SYSTEM

CROSS-REFERENCE TO RELATED APPLICATION(S) AND CLAIM OF PRIORITY

This application the benefit priority under 35 U.S.C. §119 (a) of a Korean patent application filed in the Korean Intellectual Property Office on Oct. 10, 2007 and assigned Serial No. 2007-101822, the entire disclosure of which is hereby incorporated by reference.

TECHNICAL FIELD OF THE INVENTION

The present invention relates to an apparatus and a method for performing a Hybrid Automatic Repeat reQuest (HARQ) in a wireless communication system. More particularly, the present invention relates to an apparatus and a method for processing the HARQ using information of Media Access Control (MAC) layer in a broadband wireless communication system.

BACKGROUND OF THE INVENTION

As known in the art, communication systems have been developed based on voice service and are now advancing to providing data service and various multimedia services as well as voice service. However, conventional communication systems have not satisfied users' service demands because of their relatively narrow bandwidths and expensive fees. Additionally, advances in the communication industry and users' increasing demand for Internet service raise the necessity for communication systems that efficiently provide Internet service. As a result of these trends, broadband wireless communication systems are used to efficiently provide Internet service.

Using orthogonal Frequency Division Multiplexing (OFDM)/Orthogonal Frequency Division Multiple Access (OFDMA) scheme, the broadband wireless communication system can realize a high-speed data transmission by sending a physical channel signal using subcarriers. The wireless access scheme of the broadband wireless communication system is standardized by the Institute of Electrical and Electronics Engineers (IEEE) 802.16 standardization group, which is an international standardization organization.

Typically, wireless data communications are subject to data error according to conditions of a radio channel. Error control and recovery methods include an Automatic Repeat reQuest (ARQ) scheme and a Forward Error Correction (FEC) scheme.

A HybridARQ (HARQ) scheme combines the ARQ and FEC schemes. According to the ARQ scheme, a receiver checks for error in the received packet through a Cyclic Redundancy Check (CRC) and feeds a retransmission request to a transmitter upon detecting the error, and the transmitter retransmits the corresponding packets. According to the FEC scheme, the transmitter transmits packet by adding redundancy information to the data through coding, and the receiver corrects for error in the received packet using the redundancy information.

By taking advantage of the above schemes, the HARQ scheme can correct error below a certain degree using the FEC scheme and correct error above the certain degree using the ARQ scheme. The HARQ scheme includes a Chase Combining (CC) scheme and an Incremental Redundancy (IR) scheme. According to the CC scheme, the transmitter retransmits initial transmit packets in the event of a failure of the initial transmission, and the receiver combines (or soft-combines) and decodes symbols from the initial transmit packets and the retransmit packets to obtain the gain due to the increase of the Signal to Noise Ratio (SNR). The IR scheme initially transmits some redundancy data of the encoded data and information data and additionally retransmits redundancy data not transmitted in the initial transmission. That is, the IR scheme transmits data at a low code rate in the initial transmission and increases the code rate in every retransmission to obtain an additional coding gain.

In broadband wireless communication systems, when the received HARQ burst is corrupted, the receiver feeds a retransmission request (NACK) feedback to the transmitter, and the transmitter retransmits the corresponding HARQ burst. The HARQ burst includes a plurality of Media Access Control (MAC) Packet Data Units (PDUs) of the same Modulation and Coding Scheme (MCS) level. One HARQ burst is encoded by dividing the HARQ burst into at least one FEC block. Each MAC PDU can include a code for error checking (e.g., CRC code) the ARQ of the MAC layer. Accordingly, the MAC layer can detect an erroneous MAC PDU through the error checking on each MAC PDU. However, since the physical (PHY) layer checks for error in the entire HARQ burst, it cannot acquire the location and the number of the erroneous MAC PDUs. Thus, the PHY layer performs the HARQ combination for the retransmitted HARQ bursts, divides the combined data into FEC blocks, and then decodes the data.

As discussed above, the PHY layer HARQ-processes the entire HARQ burst because the PHY layer cannot know the erroneous part (i.e., the location and the number of the MAC PDUs) of the HARQ burst. In this situation, an FEC decoder (or channel decoder) is subject to the bottleneck. As the system employs a plurality of FEC decoders to achieve a given data rate, a size increase or performance degradation of the receiver may result.

SUMMARY OF THE INVENTION

To address the above-discussed deficiencies of the prior art, it is a primary object of the present invention to address at least the above mentioned problems and/or disadvantages and to provide at least the advantages described below. Accordingly, an aspect of the present invention is to provide an apparatus and a method for conducting a Hybrid Automatic Repeat reQuest (HARQ) process using information regarding a Media Access Control (MAC) layer in a broadband wireless communication system.

Another aspect of the present invention is to provide an apparatus and a method for HARQ processing by selecting Forward Error Correction (FEC) blocks corresponding to erroneous MAC Packet Data Units (PDUs) in a broadband wireless communication system.

Yet another aspect of the present invention is to provide an apparatus and a method for HARQ-processing part of a burst in a broadband wireless communication system.

Still another aspect of the present invention is to provide an apparatus and a method for providing information of erroneous MAC PDUs of a MAC layer to a physical layer in a broadband wireless communication system.

The above aspects are achieved by providing a receiver in a wireless communication system. The receiver includes a MAC layer part for error-checking each of the MAC PDUs extracted from a physical layer burst, and generating a HARQ combination control information according to a result of the error check; a receiving part for receiving a retransmit burst; and a combiner for selecting one or more FEC blocks from the retransmit burst according to the HARQ combination control information, and HARQ-combining the selected one or more FEC blocks.

According to one aspect of the present invention, a receiver in a wireless communication system includes a MAC layer part error-checking each of MAC PDUs included in an initial transmit burst and generating HARQ combination control information according to a result of the error check; and a physical layer part for, upon receiving a retransmit burst, selecting one or more FEC blocks from the retransmit burst according to the HARQ combination control information and HARQ-processing the selected FEC blocks.

According to another aspect of the present invention, a receiving method in a wireless communication system includes generating HARQ combination control information using a result of error checking MAC PDUs extracted from a physical layer burst; receiving a retransmit burst; and selecting one or more FEC blocks from the retransmit burst according to the HARQ combination control information, and HARQ-combining the selected FEC blocks.

According to yet another aspect of the present invention, a receiving method in a wireless communication system includes error-checking, at a MAC layer part, each of MAC PDUs included in an initial transmit burst and generating HARQ combination control information according to a result of the error check; and upon receiving a retransmit burst, selecting, at a physical layer part, one or more FEC blocks from the retransmit burst according to the HARQ combination control information and HARQ-processing the selected FEC blocks.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a method for processing a Hybrid Automatic Repeat reQuest (HARQ) by selecting Forward Error Correction (FEC) blocks corresponding to erroneous Media Access Control (MAC) Packet Data Units (PDUs) in a broadband wireless communication system.

Hereinafter, while a broadband wireless access communication system based on Orthogonal Frequency Division Multiplexing (OFDM)/Orthogonal Frequency Division Multiple Access (OFDMA) is illustrated by way of example, the present invention is applicable to any other communication systems using a HARQ.

Figure 1:
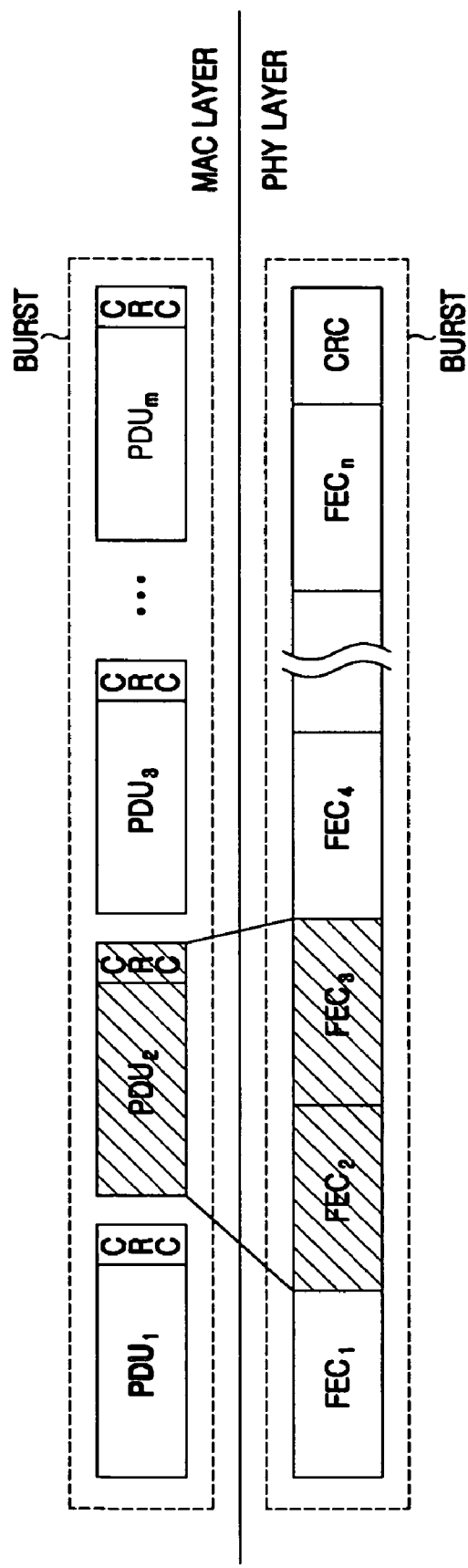
FIG. 1 is a diagram illustrating a HARQ processing according to an exemplary embodiment of the present invention.

FIG. 1 depicts a HARQ processing according to an exemplary embodiment of the present invention.

A burst includes a plurality of MAC PDUs, and the burst in the physical layer includes a plurality of FEC blocks. For error-checking in the MAC layer, every MAC PDU includes an error checking code (e.g., Cyclic Redundancy Check (i.e., CRC)-32). For error-checking in the physical layer, every burst includes one error checking code. Hence, the MAC layer can check for error in each MAC PDU, and the physical layer can check for error in the entire burst.

Upon receiving bursts from a transmitter, a receiver checks for error in the physical layer on a burst basis. When detecting error in the physical layer burst, the physical layer of the receiver feeds a retransmission request (NACK) back to the transmitter, and the transmitter retransmits the corresponding burst. By contrast, the MAC layer processes the initial transmit burst on a MAC PDU basis. As shown in FIG. 1, when an error is detected in the second MAC PDU of the initial transmit, the MAC layer provides information regarding the second MAC PDU (information of the FEC blocks of the second MAC PDU) to the physical layer. The physical layer HARQ-combines the FEC blocks corresponding to the second MAC PDU (the second FEC block and the third FEC block) with respect to the retransmitted burst, decodes the HARQ-combined data, and then provides the decoded data to the MAC layer. Herein, the error check and the ARQ of each MAC PDU are conducted in the low MAC layer, and it is assumed that the error-checked MAC PDU is processed as signal or traffic in the high MAC layer.

Figure 2:
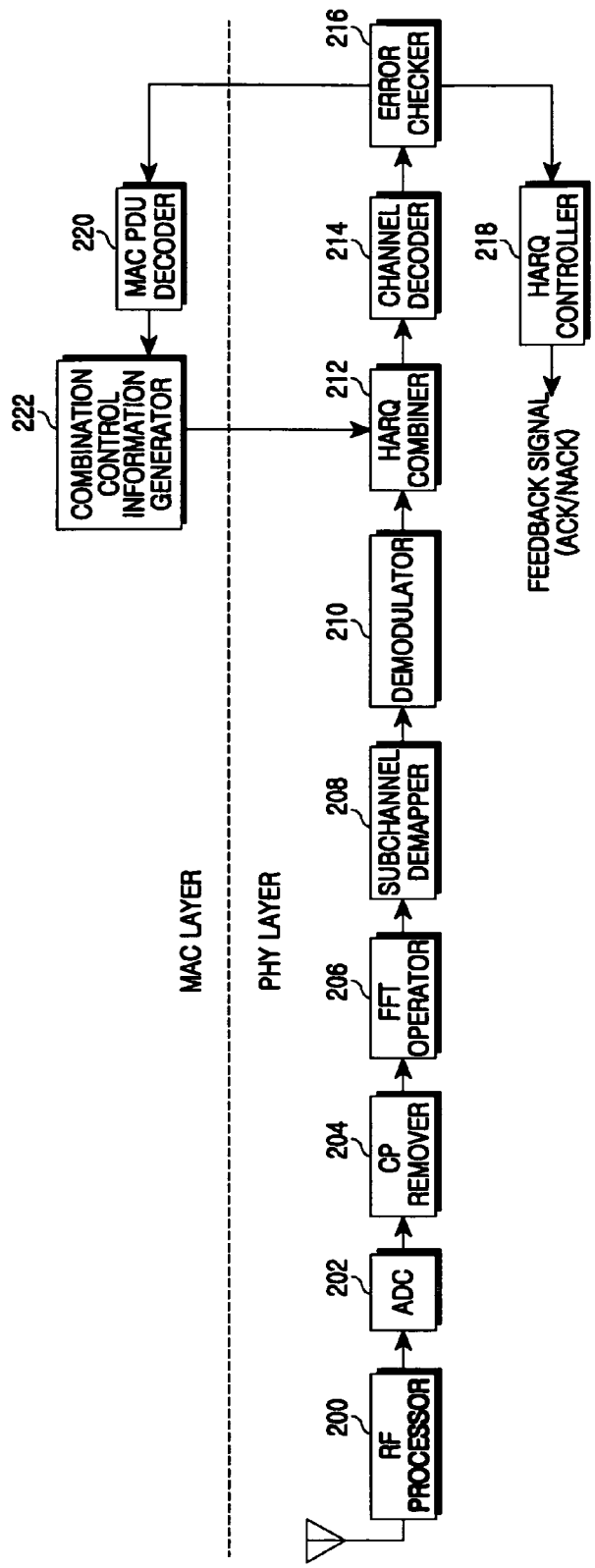
FIG. 2 is a block diagram of a receiver in a broadband wireless communication system according to an exemplary embodiment of the present invention.

FIG. 2 is a block diagram of the receiver in the broadband wireless communication system according to an exemplary embodiment of the present invention. Relatively, the receiver herein can be a terminal in the downlink and a base station in the uplink.

The receiver of FIG. 2 includes a radio frequency (RF) processor 200, an analog-to-digital converter (ADC) 202, a cyclic prefix (CP) remover 204, a Fast Fourier Transform (FFT) operator 206, a subchannel demapper 208, a demodulator 210, a HARQ combiner 212, a channel decoder 214, an error checker 216, a HARQ controller 218, a MAC PDU decoder 220, and a combination control information generator 222.

The RF processor 200 converts an RF signal received via an antenna into a baseband signal. The ADC 202 converts the analog signal output from the RF processor 200 into baseband sample data. The CP remover 204 removes a guard interval (e.g., CP) from the sample data output from the ADC 202.

The FFT operator 206 outputs frequency-domain data by applying FFT to the baseband sample data output from the CP remover 204. The subchannel demapper 208 arranges the frequency-domain data output from the FFT operator 206 by the burst unit. Herein, the burst is assumed to include at least one FEC block.

The demodulator 210 demodulates the burst data output from the subchannel demapper 208 according to a modulation scheme and outputs a log likelihood ratio (LLR) value of each coded bit. The HARQ combiner 212 buffers the LLR data (the burst data) output from the demodulator 210 for HARQ combination. In the initial (or first) transmission, the HARQ combiner 212 provides the current LLR data to the channel decoder 214 without HARQ combination. In the retransmission, the HARQ combiner 212 HARQ-combines the current LLR data with the previous LLR data and provides the combined data to the channel decoder 214. The HARQ combiner 212 receives information regarding an erroneous MAC PDU (or information regarding an erroneous FEC block) from the MAC layer, selects and HARQ-combines the corresponding FEC blocks according to the HARQ combination control information received from the MAC layer, and provides the combined data to the channel decoder 214.

The channel decoder 214 decodes the LLR data output from the HARQ combiner 212. The channel decoder 214 can decode, for example, a Turbo code (TC), a Low Density Parity Check (LDPC) code, a Convolutional Turbo Code (CTC), and so forth. The error checker 216 checks for error in the decoded data output from the channel decoder 214 and provides the result to the HARQ controller 218. The HARQ controller 218 generates a feedback signal (ACK or NACK) according to the result of the error check and feeds the feedback signal back to the transmitter. The error checker 216 also provides the decoded data output from the channel decoder 214 to the MAC layer (the low MAC layer).

The MAC PDU decoder 220 of the MAC layer detects MAC PDUs from the data provided from the physical layer and checks a header and error (CRC) of each MAC PDU. Depending on the result of the header check, the corresponding MAC PDU is processed as a signal or traffic in the high MAC layer. The MAC PDU decoder 220 provides the combination control information generator 222 with a bit stream indicative of the error in the MAC PDUs included in the burst.

The combination control information generator 222 generates HARQ combination control information using the bit stream and provides the generated HARQ combination control information to the HARQ combiner 212 of the physical layer. Herein, the combination control information generator 222 determines which PDU has an error using the bit stream, and calculates a start offset (NACK_PDU_start_offset) corresponding to the start point of the erroneous PDU in the burst and an end offset (NACK_PDU_end_offset) corresponding to the end point of the erroneous PDU in the burst. When successive errors occur, the start offset is calculated based on the start point of the first PDU of the successive PDUs and the end offset is calculated based on the end point of the last PDU of the successive PDUs. The combination control information generator 222 converts the start offset and the end offset into FEC-based offsets of the physical layer burst and provides the converted offsets to the HARQ combiner 212. For instance, when the start FEC offset is 3 and the end FEC offset is 4, the HARQ combiner 212 HARQ-combines the third FEC block and the fourth FEC block of the burst and provides the combined data to the channel decoder 214. As for discontinuous errors in the burst, the combination control information generator 222 can provide a plurality of offset pairs (i.e., (start FEC offset 1, end FEC offset 1), (start FEC offset 2, end FEC offset)) to the physical layer.

As such, part of the HARQ burst is HARQ-combined and decoded using the result of the error check on the previous burst in the MAC layer. When part of the burst, rather than the entire burst, is HARQ-combined and decoded, the processing time and the power consumption of the receiver can be lowered.

Figure 3A:
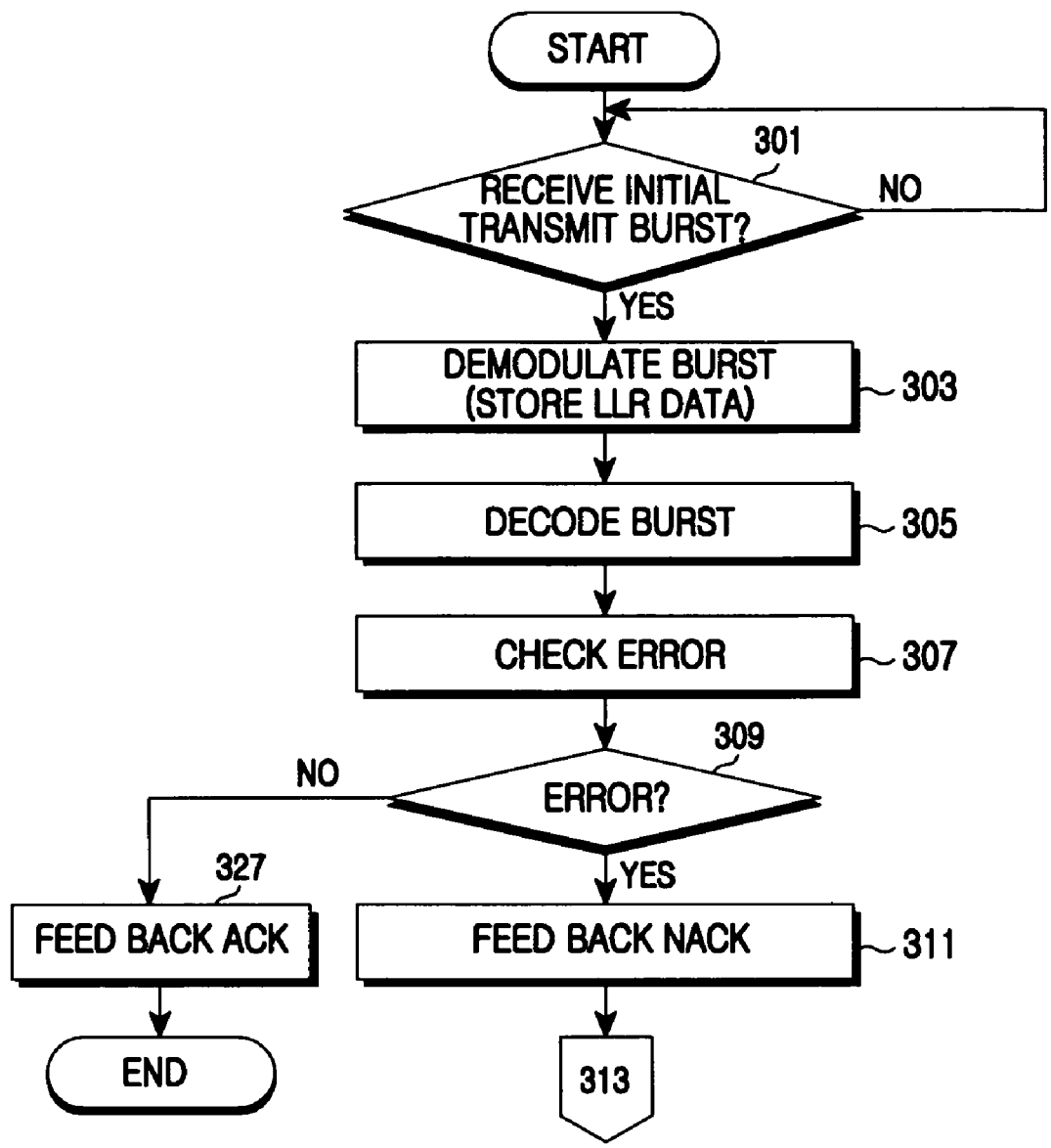
FIGS. 3A and 3B are a flowchart illustrating operations of the receiver in the broadband wireless communication system according to an exemplary embodiment of the present invention.
Figure 3B:
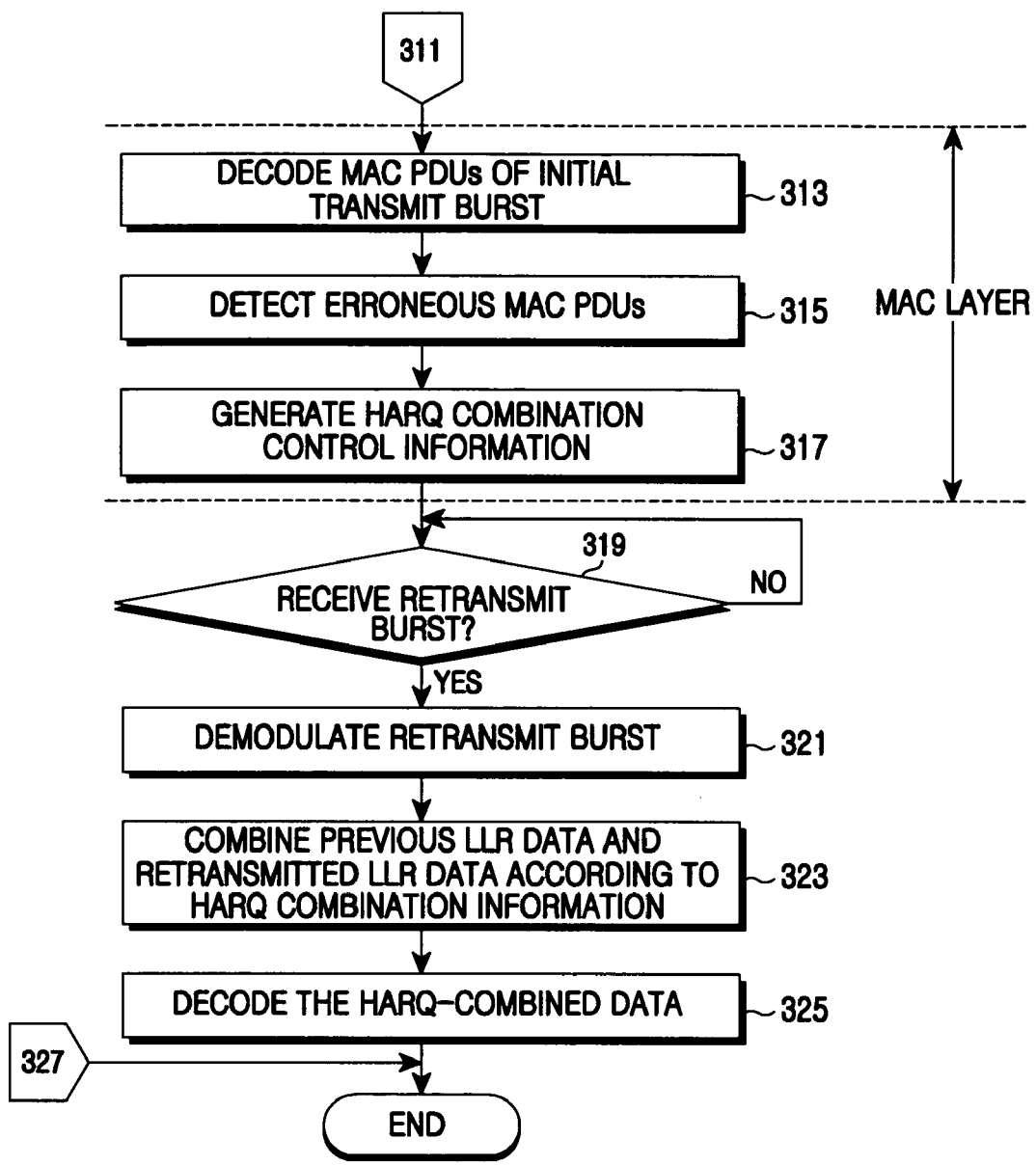

FIGS. 3A and 3B are a flowchart illustrating operations of the receiver in the broadband wireless communication system according to an exemplary embodiment of the present invention. Relatively, the receiver herein can be a terminal in the downlink and the base station in the uplink. To ease the understanding, one-time retransmission is exemplified.

In step 301, the receiver determines whether an initial transmit burst is received. When receiving the initial transmit burst, the receiver generates LLR data by demodulating the received initial transmit burst and stores the LLR data for HARQ combination in step 303.

In step 305, the receiver generates information data by soft-decision decoding the LLR data. In step 307, the receiver checks for error in the information data. For example, the receiver separates the CRC code from the information data, generates a CRC code for the separated information data, and checks for error by comparing the separated CRC code with the generated CRC code.

In step 309, the receiver determines whether the information data contains an error. When the information data is free of error, the receiver feeds a reception success signal (ACK) back to the transmitter in step 327. Next, the receiver processes the error-free information data in the MAC layer on a MAC PDU basis as a signal or traffic according to the information in the payload of the MAC PDU. When the information data contains an error, the receiver feeds a retransmission request signal (NACK) back to the transmitter in step 311.

In step 313, the receiver performs MAC PDU decoding on the information data. In more detail, the receiver detects MAC PDUs from the information data and checks for header and error in each MAC PDU. In step 315, the receiver detects the erroneous MAC PDU in the burst according to the result of the error check. That is, the receiver checks which MAC PDU in the burst has an error. In step 317, the receiver generates HARQ combination control information using the information regarding the erroneous MAC PDU. For example, the receiver converts the position corresponding to the start point of the erroneous PDU in the burst to an FEC-based offset of the physical layer burst, converts the position corresponding to the end point of the PDU in the burst to an FEC-based offset of the physical layer burst, and generates a HARQ combination control information with the offset pair (the start FEC offset and the end FEC offset). The steps 313 through 317 are performed in the MAC layer.

In step 319, the receiver checks whether a retransmit burst has been received from the transmitter. Upon receiving the retransmit burst, the receiver generates LLR data by demodulating the retransmit burst instep 321. Instep 323, the receiver HARQ-combines the initial transmit LLR data (the previous LLR data) with the retransmit LLR data (the current LLR data) according to the generated HARQ combination control information in step 323. In doing so, the receiver performs the HARQ combination by selecting data of the FEC blocks corresponding to the MAC PDU corrupted in the initial transmission. That is, the FEC blocks having an error in the burst passes through the HARQ combination.

In step 325, the receiver generates information data by decoding the combined data. The information data is processed in the MAC layer on a MAC PDU basis. After passing through the error check, the data is processed as a signal or traffic according to the information in the payload. Meanwhile, the receiver can check for error in the burst by concatenating the initial transmit FEC blocks (the decoded data) with the FEC blocks generated through the HARQ combination (the decoded data). In doing so, when an error is detected, the receiver feeds a retransmission request signal (NACK) back to the transmitter. Upon detecting no error, the receiver can feed a reception success signal (ACK) back to the transmitter.

Figure 4:
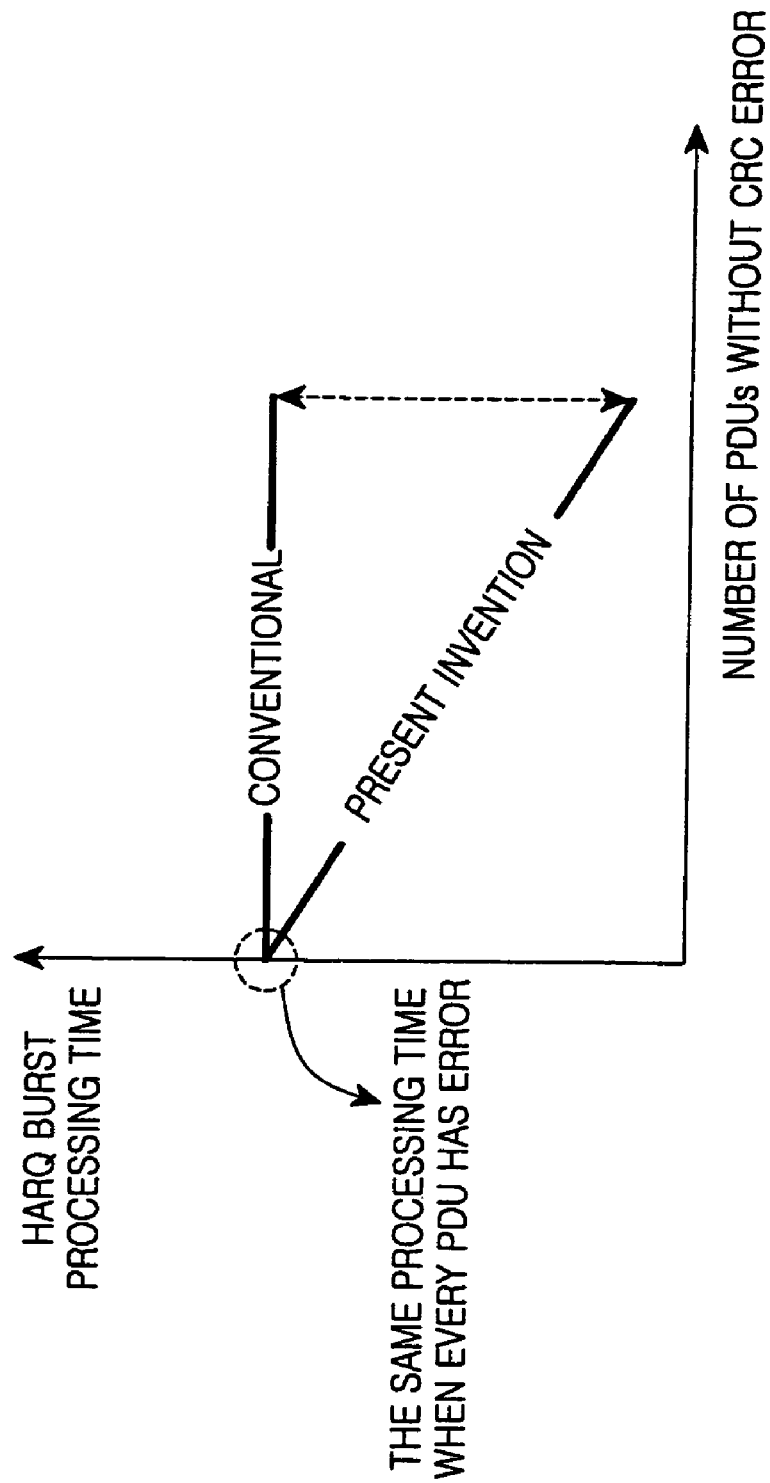
FIG. 4 is a graph comparing the present method and the conventional method in terms of processing time.

FIG. 4 compares the present method and the conventional method in terms of processing time.

Since the number of the MAC PDUs is variable, it is hard to discretely represent the processing time of the HARQ burst. Instead, the processing time is represented as a linear graph as shown in FIG. 4. When every MAC PDU in one burst is corrupted, the processing time of the present invention is the same as in the conventional method. Yet, as the number of the error-free PDUs increases, the total processing time of the present invention drastically decreases when compared to the conventional method.

Figure 5A:
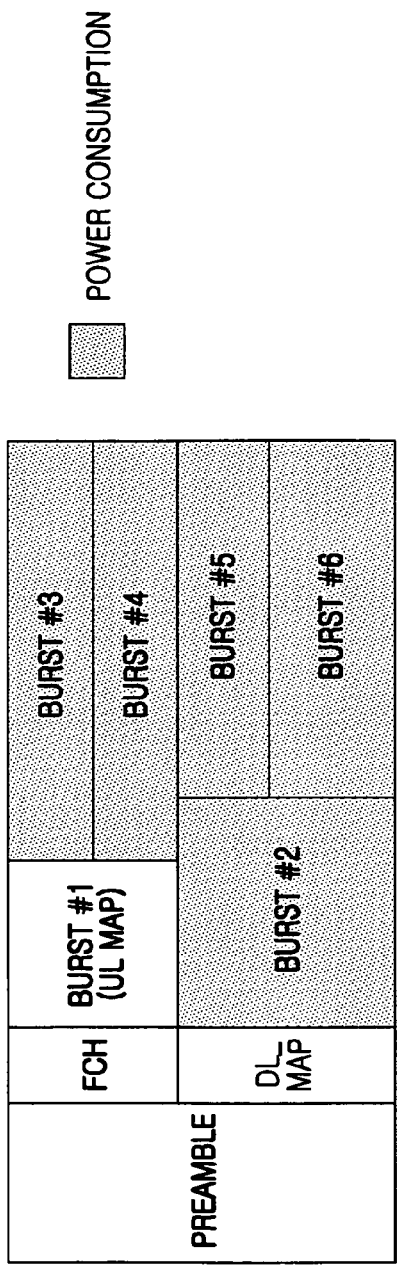
FIGS. 5A and 5B are diagrams comparing the present method and the conventional method in terms of power consumption.
Figure 5B:
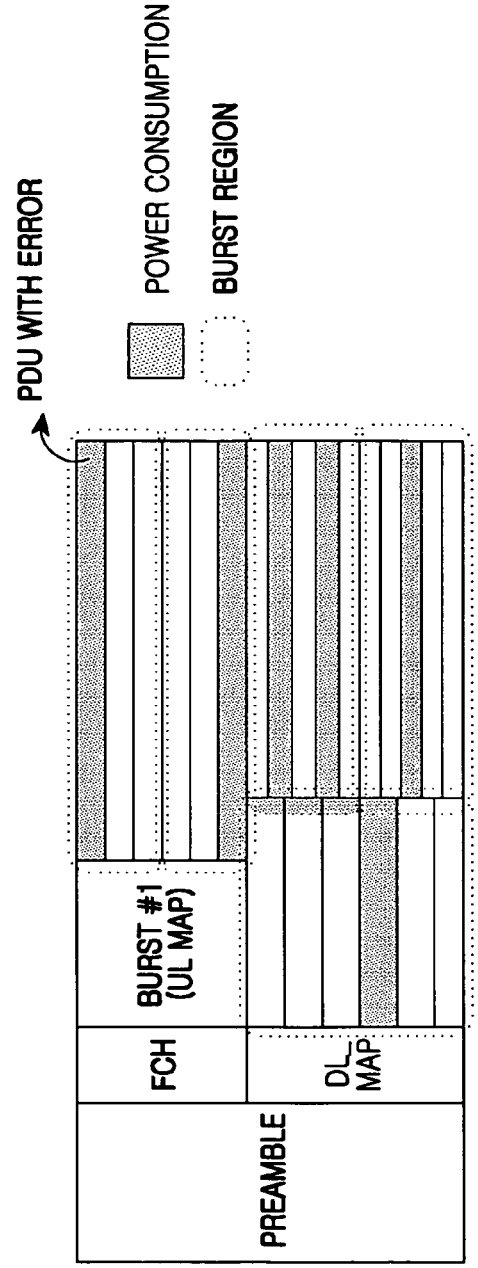

FIGS. 5A and 5B compare the present method and the conventional method in terms of power consumption.

Particularly, FIGS. 5A and 5B depict a downlink frame of the broadband wireless communication system. The downlink frame can include a preamble, a Frame Control Header (FCH), a DownLink (DL) MAP, an UpLink (UL) MAP, and DL data bursts. The DL preamble is used for the initial synchronization acquisition and the cell search of the terminal, and the FCH carries information regarding the basic constitution of the frame. The DL MAP carries information indicative of the DL data burst regions, and UL MAP carries information regarding the structure of the UL frame.

FIG. 5A shows the conventional frame, which requires power consumption during the entire HARQ burst. FIG. 5B shows the frame of the present invention, which requires power consumption during the erroneous PDU of HARQ burst. In conclusion, the present invention can greatly lower power consumption by HARQ-processing part of the burst.

As set forth above, by selecting and HARQ-processing the FEC blocks corresponding to the erroneous MAC PDU, processing time can be reduced. Moreover, as the number of error-free PDUs increases, the total HARQ processing time is significantly reduced. Also, power consumption can be greatly lowered by HARQ-processing merely part of the burst, i.e., by HARQ-combining and decoding part of the burst, not the entire burst.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiver in a wireless communication system, the receiver comprising:
   a media access control (MAC) layer part configured to perform an error check on each of a plurality of MAC packet data units (PDUs) extracted from a physical layer burst and to generate a hybrid automatic repeat request (HARQ) combination control information based on the error checks;
   a receiving part configured to receive a retransmit burst; and
   a combiner configured to select one or more forward error correction (FEC) blocks from the retransmit burst based on the HARQ combination control information and to HARQ-combine the selected one or more FEC blocks.

2. The receiver of claim 1, wherein the MAC layer part comprises:
   a PDU decoder configured to detect MAC PDUs in physical layer burst and check for a header and error in each of the detected MAC PDUs; and
   a control information generator configured to generate the HARQ combination control information.

3. The receiver of claim 2, wherein the control information generator is configured to calculate a start offset corresponding to a start point of an erroneous MAC PDU in the burst and an end offset corresponding to an end point of the erroneous MAC PDU in the burst, convert the start offset and the end offset into FEC block based offsets of a physical layer, and generate the HARQ combination control information with the converted FEC block based offsets.

4. The receiver of claim 1, wherein the HARQ combination control information comprises a start offset corresponding to a start point of an erroneous MAC PDU in the physical layer burst and an end offset corresponding to an end point of the erroneous MAC PDU in the physical layer burst.

5. The receiver of claim 4, wherein, when successive MAC PDUs contain an error, the HARQ combination control information comprises a start offset corresponding to a start point of a first MAC PDU of the successive MAC PDUs in the physical layer burst and an end offset corresponding to an end point of a last MAC PDU of the successive MAC PDUs in the physical layer burst.

6. The receiver of claim 4, wherein, when discontinuous MAC PDUs contain an error, the HARQ combination control information comprises a plurality of offset pairs.

7. The receiver of claim 1, wherein the combiner comprises a buffer for storing a log-likelihood ratio (LLR) data of the burst, and the combiner is configured to combine LLR data of a previously received burst and a currently received LLR data according to the HARQ combination control information.

8. The receiver of claim 1, wherein the receiver comprises:
   an orthogonal frequency division multiplexing (OFDM) demodulator configured to generate a frequency-domain data by OFDM-demodulating a received signal;
   a subchannel demapper configured to extract the retransmit burst from the frequency-domain data; and
   a demodulator configured to demodulate the extracted retransmit burst and provide the demodulated data to the combiner.

9. The receiver of claim 1, further comprising:
   a channel decoder configured to decode data output from the combiner;
   a checker configured to perform an error check on the decoded data output from the channel decoder; and
   a HARQ controller configured to generate a feedback signal according to the result of the error check of the checker.

10. A receiving method in a wireless communication system, the method comprising:
- performing an error check on each of a plurality of media access control (MAC) packet data units (PDUs) extracted from a physical layer burst;
- generating a hybrid automatic repeat request (HARQ) combination control information based on the error checks;
- receiving a retransmit burst;
- selecting one or more forward error correction (FEC) blocks from the retransmit burst based on the HARQ combination control information; and
- HARQ-combination the selected FEC blocks.

11. The receiving method of claim 10, further comprising detecting one or more MAC PDUs in the physical layer burst, wherein performing the error check comprises checking for a header error in each of the detected MAC PDUs.

12. The receiving method of claim 11, wherein generating the control information comprises:
- calculating a start offset corresponding to a start point of an erroneous MAC PDU in the burst and an end offset corresponding to an end point of the erroneous MAC PDU in the burst;
- converting the start offset and the end offset into FEC block based offsets of the physical layer; and
- generating the HARQ combination control information with the converted FEC block based offsets.

13. The receiving method of claim 10, wherein the HARQ combination control information comprises a start offset corresponding to a start point of an erroneous MAC PDU in the physical layer burst and an end offset corresponding to an end point of the erroneous MAC PDU in the physical layer burst.

14. The receiving method of claim 13, wherein, when successive MAC PDUs contain an error, the HARQ combination control information comprises a start offset corresponding to a start point of a first MAC PDU of the successive MAC PDUs in the physical layer burst and an end offset corresponding to an end point of a last MAC PDU of the successive MAC PDUs in the physical layer burst.

15. The receiving method of claim 13, wherein, when discontinuous MAC PDUs contain an error, the HARQ combination control information comprises a plurality of offset pairs.

16. The receiving method of claim 10, wherein HARQ combining combines a log-likelihood ratio (LLR) data of a previously received burst and an LLR data of a currently received burst according to the HARQ combination control information.

17. The receiving method of claim 10, wherein receiving a retransmit burst comprises:
- generating a frequency-domain data by orthogonal frequency division multiplexing (OFDM)-demodulating a received signal;
- extracting the retransmit burst from the frequency-domain data; and
- demodulating the extracted retransmit burst.

18. The receiving method of claim 10, further comprising:
- decoding the HARQ-combined data;
- performing an error check on the decoded data; and
- feeding a feedback signal to a transmitter according to a result of the error check.

19. A receiving method in a wireless communication system, the method comprising:
- receiving an initial transmit burst from a transmitter;
- detecting an error in a physical layer of the initial transmit burst;
- based on the detected error in the physical layer of the initial transmit burst,
  - (i) transmitting a retransmission request to the transmitter,
  - (ii) decoding a plurality of media access control (MAC) packet data units (PDUs) extracted from the physical layer of the initial transmit burst,
  - (iii) detecting in the decoded MAC PDUs one or more erroneous MAC PDUs, wherein each of the erroneous MAC PDUs comprises an error, and
  - (iv) generating a hybrid automatic repeat request (HARQ) combination control information based on the detected erroneous MAC PDUs;
- receiving a retransmit burst from the transmitter in response to the retransmission request;
- selecting one or more forward error correction (FEC) blocks from a physical layer of the retransmit burst based on the HARQ combination control information; and
- HARQ-combining the selected one or more FEC blocks.

20. The method of claim 19, wherein generating the HARQ combination control information comprises calculating a start offset corresponding to a start point of an erroneous MAC PDU and an end offset corresponding to an end point of the erroneous MAC PDU and converting the start offset and the end offset into FEC-based offsets.

* * * * *